(12) United States Patent
Yassin et al.

(10) Patent No.: US 6,829,745 B2
(45) Date of Patent: Dec. 7, 2004

(54) METHOD AND SYSTEM FOR TRANSFORMING AN XML DOCUMENT TO AT LEAST ONE XML DOCUMENT STRUCTURED ACCORDING TO A SUBSET OF A SET OF XML GRAMMAR RULES

(75) Inventors: Amr Yassin, Ossining, NY (US); Yasser Alsafadi, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 645 days.

(21) Appl. No.: 09/894,103

(22) Filed: Jun. 28, 2001

(65) Prior Publication Data

US 2004/0205549 A1 Oct. 14, 2004

(51) Int. Cl.[7] .............................................. G06F 17/00
(52) U.S. Cl. ...................................... 715/513; 715/523
(58) Field of Search ................................ 715/513, 523; 717/106, 107, 143; 709/203; 707/100, 101, 102

(56) References Cited

U.S. PATENT DOCUMENTS

| | | | | |
|---|---|---|---|---|
| 6,083,276 | A | * | 7/2000 | Davidson et al. ........... 717/107 |
| 6,182,029 | B1 | * | 1/2001 | Friedman ....................... 704/9 |
| 6,230,173 | B1 | * | 5/2001 | Ferrel et al. ................. 715/513 |
| 6,336,214 | B1 | * | 1/2002 | Sundaresan .................. 717/143 |

(List continued on next page.)

FOREIGN PATENT DOCUMENTS

WO    WO0056033    9/2000    ........... H04L/29/06

OTHER PUBLICATIONS

Andrivet, "A Simple XML Parser", C/C++ users Journal, Jul. 1999, pp. 22–32.*

(List continued on next page.)

*Primary Examiner*—Sanjiv Shah
(74) *Attorney, Agent, or Firm*—Gregory L. Thorne

(57) ABSTRACT

A method and system are for transforming an XML document structured according to a set of XML grammar rules to at least one XML document structured according to at least one subset of the set of XML grammar rules. The system includes a controller capable of executing a set of programmable instructions for retrieving at least one grammar restriction style sheet (GRSS) corresponding to at least one subset of a set of XML grammar rules, where the at least one GRSS includes transformation rules for transforming an XML document to at least one XML document structured according to the at least one subset of the set of XML grammar rules; and a transformation engine for using the transformation rules of each retrieved GRSS for transforming data elements of the XML document to data elements structured according to the at least one subset of the set of XML grammar rules to transform the XML document to the at least one XML document structured according to the at least one subset of the set of XML grammar rules. The method includes the steps of retrieving at least one GRSS corresponding to the at least one subset of a set of XML grammar rules, where the at least one GRSS includes transformation rules for transforming an XML document to at least one XML document structured according to the at least one subset of the set of XML grammar rules; and transforming data elements of the XML document using the transformation rules of the at least one retrieved GRSS to data elements structured according to the at least one subset of the set of XML grammar rules to transform the XML document to the at least one XML document structured according to the at least one subset of the set of XML grammar rules.

21 Claims, 2 Drawing Sheets

U.S. PATENT DOCUMENTS

| | | | |
|---|---|---|---|
| 6,446,110 B1 * | 9/2002 | Lection et al. | 709/203 |
| 6,507,857 B1 * | 1/2003 | Yalcinalp | 715/513 |
| 6,519,260 B1 * | 2/2003 | Galyas et al. | 370/395.42 |
| 6,535,896 B2 * | 3/2003 | Britton et al. | 715/523 |
| 6,584,480 B1 * | 6/2003 | Ferrel et al. | 715/513 |
| 6,675,370 B1 * | 1/2004 | Sundaresan | 717/106 |

OTHER PUBLICATIONS

US patent application Ser. No. 09/725,970 entitled "Scalable Parser for Extensible Mark–Up Language" for Alsafadi, filed Nov. 29, 2000.

* cited by examiner

METHOD AND SYSTEM FOR TRANSFORMING AN XML DOCUMENT TO AT LEAST ONE XML DOCUMENT STRUCTURED ACCORDING TO A SUBSET OF A SET OF XML GRAMMAR RULES

BACKGROUND OF THE INVENTION

1. Technical Field

The present invention relates generally to data processing. Specifically, the present invention relates to a method and system for transforming an Extensible Markup Language (XML) document structured according to a set of XML grammar rules to at least one XML document structured according to a subset of the set of XML grammar rules.

2. Background of the Related Art

Extensible Markup Language (XML) is emerging as a universal language for structuring documents for transmission via the World Wide Web (WWW). XML includes a set of XML grammar rules for structuring documents, primarily web-based documents, in order to provide extensibility, portability, and adaptability of such documents.

For example, XML 1.0 which includes a grammar rule set of over eighty grammar rules provides clients with increased document processing capabilities, such as quickly accessing specific data via the Internet in response to a search query and reducing the processing load on servers by performing less document searching routines to locate a specific document. Accordingly, XML is a tool that significantly reduces network data traffic and improves query search response times.

In order to process a document structured in XML, the XML document is first parsed by an XML parser. The XML parser is typically a set of programmable instructions stored within a computing device, such as a server or a PC. The XML parser extracts data elements of the XML document in accordance with the XML grammar rule set. Second, an Extensible Style Language (XSL) style sheet accompanying the XML document is accessed. The XSL style sheet sets forth instructions for retrieving selected extracted data elements of the XML document and reformatting them to another format for presentation thereof or transformation to web-based language, such as HTML.

The extracted data elements and the XSL style sheet are provided to an Extensible Style Language Transformation (XSLT) engine having software modules for transforming each extracted data element in accordance with the instructions set forth by the XSL style sheet.

Personal digital assistants (PDAs), cellular telephones, set-top boxes, etc. capable of accessing the Internet or other network for allowing clients to engage in e-commerce and access data through wired or wireless network connections have limited processing and information storage resources. Hence, these computing devices, also known as thin devices, when receiving XML documents and XSL style sheets, e.g., via a network, typically do not have adequate resources for processing and storing the programmable instructions of an XML parser for parsing the received XML documents to extract data elements. They also typically do not have adequate resources for processing and storing the software modules of the XSLT engine for transforming the extracted data elements according to the instructions set forth by the XSL style sheet.

Accordingly, thin devices have been proposed where a micro-parser is provided therein for parsing the received XML documents to extract data elements. The micro-parser would contain programmable instructions indicative of only a subset of the XML grammar rule set to forego from over-loading the processing resources and from using too much of the storage resources of the thin device for storing the entire XML grammar rule set. Therefore, XML documents received by such a thin device would have to be structured according to the subset of the XML grammar rule set, i.e., the subset of grammar rules that the micro-parser of the thin device is programmed with, in order to enable the thin device to correctly parse and transform the incoming XML documents to a usable and understandable format.

It is, however, impractical and unrealistic to provide all thin devices with the same micro-parser. As such, it is envisioned that many thin devices would be brought to market where each thin device is likely to have a different micro-parser than another thin device, i.e., a micro-parser of a cellular telephone would be likely to be programmed with a different subset of the XML grammar rule set than a micro-parser of a PDA. For example; the cellular telephone is likely to have a micro-parser programmed with seven XML grammar rules and the PDA is likely to have a micro-parser programmed with twelve XML grammar rules.

Hence, an XML document having data structured in XML according to the full set of XML grammar rules is not likely to be correctly transformed or translated by computing devices which have micro-parsers programmed with only a subset of the full set of XML grammar rules.

A need therefore exists for a method and system for correctly transforming an XML document structured according to a set of XML grammar rules to one or more XML documents structured according to one or more subsets of the set of XML grammar rules.

SUMMARY OF THE INVENTION

The present invention provides a method and system for transforming an XML document structured according to a set of XML grammar rules to at least one XML document structured according to at least one subset of the set of XML grammar rules. The system of the present invention includes a controller capable of executing a set of programmable instructions for retrieving at least one grammar restriction style sheet (GRSS) corresponding to at least one subset of a set of XML grammar rules, where the at least one GRSS includes transformation rules for transforming an XML document to at least one XML document structured according to the at least one subset of the set of XML grammar rules; and a transformation engine for using the transformation rules of each retrieved GRSS for transforming data elements of the XML document to data elements structured according to the at least one subset of the set of XML grammar rules to transform the XML document to the at least one XML document structured according to the at least one subset of the set of XML grammar rules.

The method includes the steps of retrieving at least one GRSS corresponding to the at least one subset of a set of XML grammar rules, where the at least one GRSS includes transformation rules for transforming an XML document to at least one XML document structured according to the at least one subset of the set of XML grammar rules; and transforming data elements of the XML document using the transformation rules of the at least one retrieved GRSS to data elements structured according to the at least one subset of the set of XML grammar rules to transform the XML document to the at least one XML document structured according to the at least one subset of the set of XML grammar rules.

DETAILED DESCRIPTION OF THE DRAWINGS

The invention is further explained by way of example and with reference to the accompanying drawings, wherein.

DETAILED DESCRIPTION OF PREFERRED EMBODIMENTS

Figure 1:
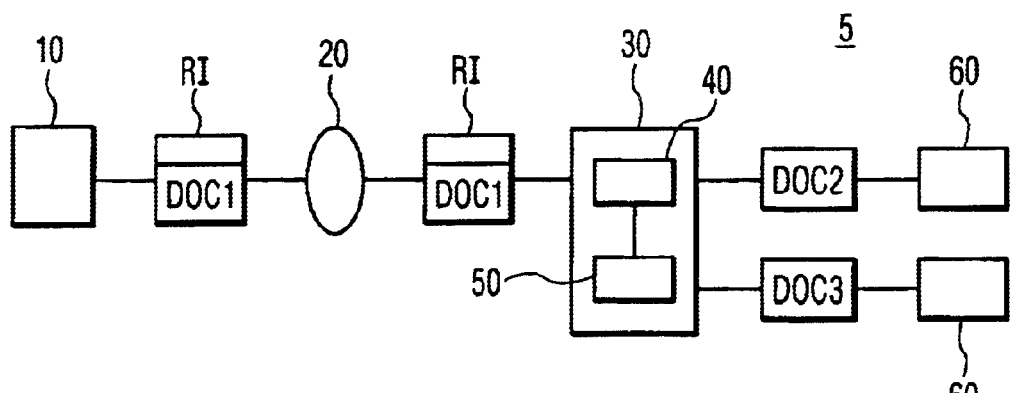
FIG. 1 is a system diagram illustrating transformation of an XML document structured according to an XML grammar rule set to two XML documents structured according to one or more subsets of the XML grammar rule set in accordance with the present invention.

With reference to FIG. 1, there is shown a system according to the present invention. The system is designated generally by reference numeral 5 and includes an originating server 10 configured for transmitting an XML document DOC1 structured according to a set of XML grammar rules, such as XML 1.0, and routing information RI associated with DOC1 via a network 20, such as the Internet, to a destination server 30. The destination server 30 includes software modules for activating an XML grammar restrictor module 40 to determine all destination computing devices of DOC1. The XML grammar restrictor module 40 uses the routing information RI for determining the destination computing devices of DOC1.

The XML grammar restrictor module 40 also determines whether the destination computing devices of DOC1 include a micro-parser configured for parsing XML documents according to one or more subsets of the set of XML grammar rules. If so, the destination server 30 provides a respective XML grammar restriction style sheet (GRSS) for each subset of the set of XML grammar rules and DOC1 to an Extensible Style Language Transformation (XSLT) engine 50.

The XSLT engine 50 transforms or translates document DOC1 into one or more documents DOC2, DOC3 using transformation rules provided by the GRSSs, such that DOC2, DOC3 are structured according to same or different subsets of XML grammar rules. It is to be understood that transforming or transformation refers to the translation of data elements of a document structured according to the XML grammar rule set into data elements structured according to a subset of the XML grammar rules set in accordance with transformation rule provided by a GRSS.

It is contemplated that the system 5 of the present invention can also transform an XML document structured according to a subset of the XML grammar rule set to an XML document structured according to a larger subset of the XML grammar rule set or the entire XML grammar rule set. That is, the system 5 can reverse transform XML documents.

After the incoming XML document DOC1 is transformed to XML documents DOC2, DOC3, the transformed documents DOC2, DOC3 are then transmitted to respective devices 60 according to the routing information RI associated with DOC1. That is, for example, DOC2 structured according to a first subset of the XML grammar rules is transmitted to one of the two devices 60 programmed with the first subset of the XML grammar rules; DOC3 which is structured according to a second subset of the XML grammar rules is transmitted to the other device 60 programmed with the second subset of XML grammar rules.

The destination server 30 is a server, such as a home server or an intermediary server, capable of accessing the network 20 for receiving DOC1. The destination server 30 has software modules and hardware for communicating with devices 60 for transmitting DOC2, DOC3 thereto. Communication between the destination server 30 and devices 60 may be through wired connections, wireless connections, one or more networks, or combinations thereof. The destination server 30 includes at least one processor for executing programmable instructions of software modules stored therein for activating and operating the XML grammar restrictor module 40, the XSLT engine 50, and communication hardware for communicating with devices 60 and the network 20.

Devices 60 are thin devices or other devices having limited processing and storage resources, such as a wireless telephone, personal digital assistant (PDA), portable computer, set-top box, smart remote control, or other type of processing device having a micro-parser for parsing XML documents structured according to a subset of the XML grammar rule set. Devices 60 include a processor, memory, and communication means for facilitating communication with the destination server 30 as is known in the art.

Figure 2:
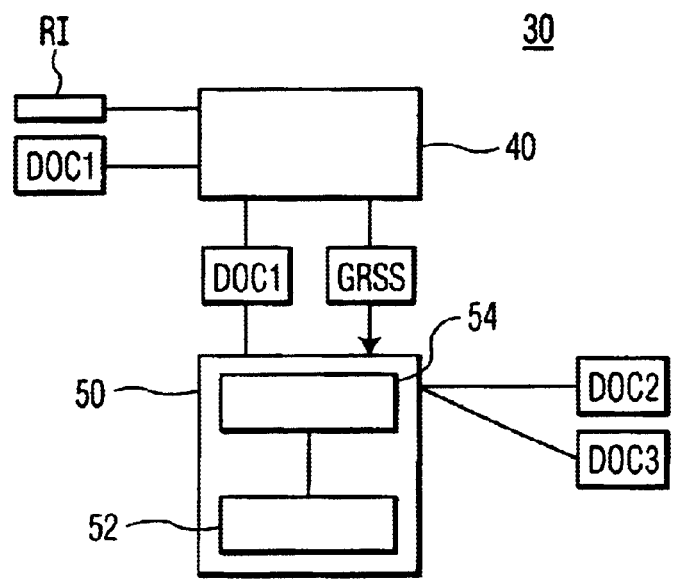
FIG. 2 is a diagram of a server shown by FIG. 1 for transforming the XML document to the XML documents structured according to the one or more subsets of the XML grammar rule set in accordance with the present invention.

FIG. 2 illustrates the XML grammar restrictor module 40 and XSLT engine 50 of the destination server 30. As mentioned above, the XML grammar restrictor module 40 accesses the routing information RI associated with each received XML document, such as DOC1, and determines the destination device, e.g., devices 60, for each XML document according to the routing information RI. The XML grammar restrictor module 40 further stores, or has access to, a collection of GRSSs, e.g., a database storing the GRSSs.

Each GRSS includes grammar transformation rules for a given subset of the XML grammar rule set for transforming an XML document structured according to the XML grammar rule set, such as DOC1 in FIG. 1, into a document structured according to the given subset of the XML grammar rule set. If the destination device of an XML document is programmed to use a subset of the XML grammar rule set for transforming received XML documents to a usable and understandable format, the XML grammar restrictor module 40 provides a GRSS corresponding to that subset of the XML grammar rule set to the XSLT engine 50. That is, the XML grammar restrictor module 40 receives the incoming XML documents and their accompanying style sheets and determines a corresponding GRSS for the incoming XML documents based on the intended destination devices of the incoming XML documents.

For example, during operation, with reference to FIG. 1, it is provided that for DOC1 received by the destination server 30, the XME grammar restrictor module 40 retrieves a GRSS corresponding to a subset of the XML grammar rule set that is used by a micro-parser of a destination device of DOC1. The destination of the incoming XML document DOC1 may be determined by the XML grammar restrictor module 40 using methods and protocols that are known in the art, such as by the routing information RI associated with the incoming XML document DOC1, use of a gateway, use of a routing table, or according to content attached to the incoming XML document DOC1. The routing information RI may be internal data, i.e., data within DOC1, external data associated with the incoming XML document DOC1, or data provided via a request/response sequence between the originating server 10 and the destination server 30.

Upon determining the destination of DOC1, the XML grammar restrictor module 40 determines if the destination device 60 uses a subset of the XML grammar rule set. If there is more than one destination device 60 for DOC1, the XML grammar rule subset that corresponds to each destination device 60 is determined. The XML grammar restrictor module 40 then accesses and retrieves the GRSS corresponding to the grammar rule subset that corresponds to each determined grammar rule subset and provides each GRSS to the XSLT engine 50 for transforming DOC1 and outputting DOC2, DOC3 to the corresponding destination devices 60, as shown by FIG. 2.

Accordingly, if the received XML document DOC1 is intended for transmission to multiple destination devices 60 using different XML grammar rule subsets of the XML grammar rule set, the XML grammar restrictor module 40 retrieves and provides a GRSS to the XSLT engine 50 for each different subset for performing multiple processing routines, where each processing routine uses a different GRSS for transforming DOC1, until DOC1 has been transformed according to grammar transformation rules provided by each retrieved GRSS. It is provided that the multiple processing routines can be performed simultaneously or sequentially by the XSLT engine 50.

If DOC1 is being routed to one or more destination devices 60 which are programmed with the same subset of the XML grammar rule set, the XML grammar restrictor module 40 provides a single GRSS to the XSLT engine 50, i.e., the GRSS corresponding to the subset of the XML grammar rule set programmed within each destination device 60. The XSLT engine 50 then parses and transforms DOC1 and outputs DOC2, DOC3 which are structured according to the same subset of the XML grammar rule set. DOC2, DOC3 are then transmitted to a respective destination device 60 by the destination server 30.

It is provided that each XML document outputted by the destination server 30 is provided with a destination indicator, such as a headend, according to its associated routing information RI to indicate the intended destination device 60.

If the DOC1 is being routed to a destination device which uses the XML grammar rule set, i.e., not a subset of the XML grammar rule set, then the DOC1 is provided to the XSLT engine 50 with the style sheet originally accompanying DOC1, either by the XML grammar restrictor module 40 or a module external to the XML grammar restrictor module 40.

A look-up table or some other mapping scheme as known in the art is used by the XML grammar restrictor module 40 to correlate the intended destination devices 60 of the received XML document DOC1 with their respective subset of the XML grammar rule set. Once the grammar restriction module 40 determines the subsets of the XML grammar rule set corresponding to the intended destination devices 60 of the received XML document DOC1, a GRSS corresponding each determined subset of the XML grammar rule set is determined using another look-up table. The one or more GRSSs are then retrieved from the collection of GRSSs or database of GRSSs and provided to the XSLT engine 50. The look-up tables are preferably stored within the destination server 30 or an external memory and accessed via the communication hardware of the destination server 30.

The XML grammar restrictor module 40 may reside within the destination server 30 or on a different server, such as an intermediary server between the originating server 10 and the destination server 30, so that it is stored and executed by at least one processor within the server on which the module 40 resides. It is contemplated that the XML grammar restrictor module 40 may be a set of instructions obtainable by a user, such as by purchasing a CD or downloading via the network 20 from a remote server.

With continued reference to FIG. 2, the XSLT engine 50 includes a parser 52 and a transformation module 54, as is known in the art. The parser 52 receives a document DOC1 and an XSL style sheet structured in XML from the XML grammar restriction module 40 and parses the document and XSL style sheet according to the XML grammar rule set. The XSLT engine 50 outputs the parsed document and the XSL style sheet to the transformation module 54.

The transformation module 54 receives the parsed XML document and an XSL style sheet, interprets the XSL style sheet, transforms the XML document based on the XSL style sheet, and outputs the transformed document. In the present invention, the XSL style sheet is the GRSS provided by the XML grammar restrictor module 40 for transforming the XML document according to a subset of the XML grammar rule set.

Figure 3:
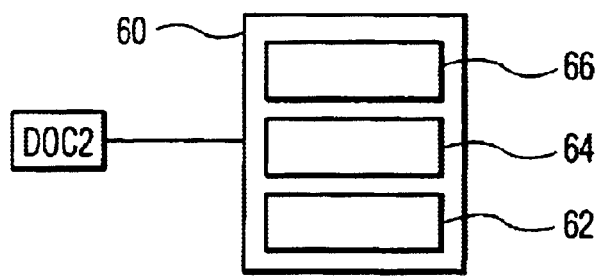
FIG. 3 is a diagram of a thin device configured for receiving an XML document structured according to a subset of the XML grammar rule set in accordance with the present invention.

FIG. 3 shows a device 60 having a micro-parser 62, an application programming interface (API) 64, and a program application 66. The device 60 receives DOC2, an XML document structured according to a subset of an XML grammar rule set. A processor within the micro-parser 62 is programmed with the subset of the XML grammar rule set for parsing DOC2 and for outputting the parsed DOC2 to the API 64. The API 64 is a commercially available API, such as a DOM or SAX API, which provides an interface between the micro-parser 62 and the program application 66. The program application 66 is one or more applications that use data received from the micro-parser 62 for controlling an operation of the device 60 and/or performing an application. For example, the program application 66 may process data received from the micro-parser 62 via the API 64 for presenting the data in a visually perceptible manner on a display of the device 60, and/or in an audibly-perceptible manner using a speaker of the device 60.

Figure 4:
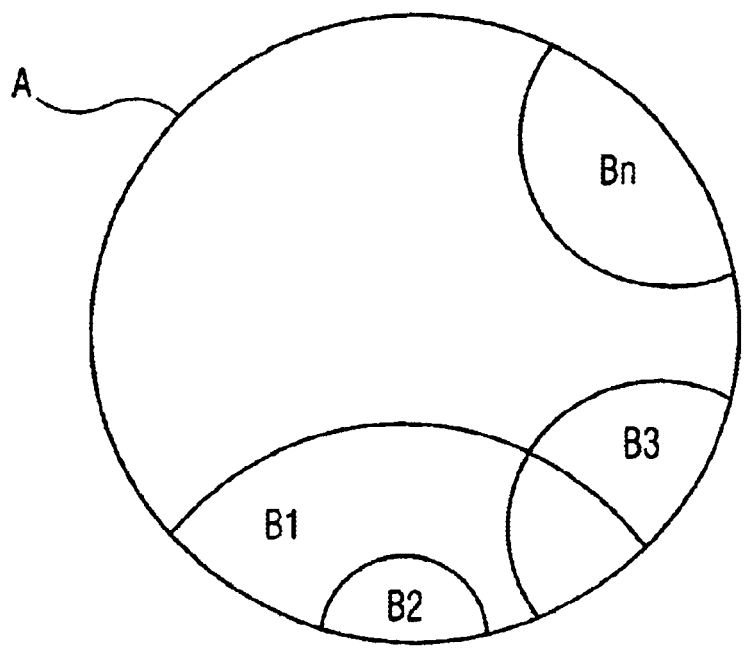
FIG. 4 is a Venn diagram showing an XML grammar rule set and associated subsets of the XML grammar rule set.
Figure 5:
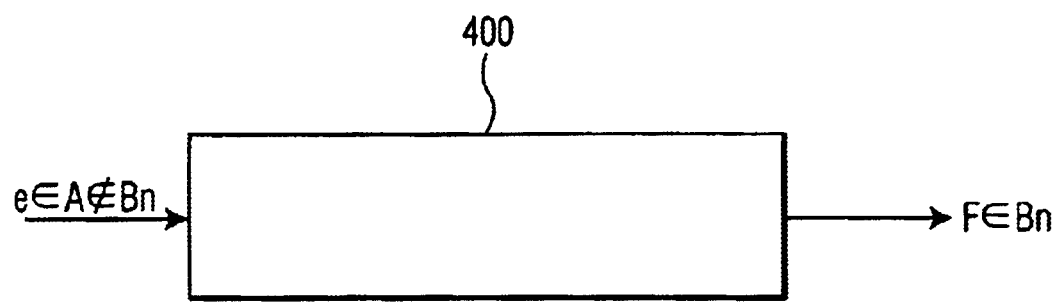
FIG. 5 is a block diagram of an XML document transformation procedure in accordance with the present invention.

With reference to FIGS. 4 and 5, each GRSS includes a set of instructions for transforming data structured in one format to another format, i.e., for implementing a transformation procedure 400 to transform data structured according to a full grammar rule set A to data structured according to a subset of the full grammar rule set A, e.g, subsets B1–Bn as shown by the Venn diagram of FIG. 4. As an example, the GRSS provides grammar transformation rules for transforming the received DOC1 into DOC2 which is structured according to the subset Bn of the XML grammar rule set. The subset of grammar rules Bn is the subset of grammar rules programmed within a micro-parser of a destination device 60 which is the intended destination device of DOC2.

As a further example, with reference to FIG. 5, the GRSS identifies each data element Epsilon in a document that does not comply with a grammar rule of subset Bn. The transformation procedure 400 as performed by the XSLT engine translates or transforms each data element Epsilon that does not comply with a grammar rule of subset Bn into a data element F that complies with at least one grammar rule of subset Bn.

A sample incoming XML document structured according to an XML grammar rule set is the following:

```
<NFLResults From="08/27/00" To="09/02/00">
    <Team Name="Atlanta">
        <Games>
            <Win>
                <Against>San Francisco</Against>
                <Score>36/8</Score>
            </Win>
            <Lose/>
        </Games>
    </Team>
    ...
</NFLResults>
```

The same document is shown below after being transformed by the XSLT engine 50 via the transformation procedure 400, using a GRSS provided by the XML grammar restriction module 40 that corresponds to a subset of the XML grammar rule set, in accordance with the present invention. The changes to the document are shown in bold.

```
<NFLResults>
    <From>08/27/00</From>
    <To>09/02/00</To>
    <Team>
        <Name>Atlanta</Name>
        <Games>
            <Win>
                <Against>San Francisco</Against>
                <Score>36/28</Score>
            </Win>
            <Lose></Lose>
        </Games>
    </Team>
    ...
</NFLResults>
```

It is provided that the XML grammar restrictor module 40 and the XSLT engine 50 form an XML grammar restrictor. The XML grammar restrictor includes a set of programmable instructions which are stored within a computer readable medium, such as a diskette and a CD, or a memory. A controller or processor of a general purpose computer, such as a PC or a server, is capable of running the XML grammar restrictor to retrieve at least one GRSS from the collection or database of GRSSs, and transform XML documents structured according to the XML grammar rule set to XML documents structured according to a subset of the XML grammar rule set as described above. It is contemplated that the collection or database of GRSSs is provided within the XML grammar restrictor.

It is understood that various modifications may be made to the embodiments disclosed herein and that the above description should not be construed as limiting, but merely as exemplary of preferred embodiments. Accordingly, those skilled in the art will envision other modifications within the scope and spirit of the claims appended hereto.

What is claimed is:

1. A method for transforming an XML document structured according to a set of XML grammar rules into at least one XML document structured according to at least one subset of the set of XML grammar rules, the method comprising the steps of:

retrieving at least one grammar restriction style sheet (GRSS) corresponding to the at least one subset of a set of XML grammar rules, where the at least one GRSS includes transformation rules for transforming the XML document to the at least one XML document structured according to the at least one subset of the set of XML grammar rules; and transforming data elements of the XML document using the transformation rules of the at least one retrieved GRSS to data elements structured according to the at least one subset of the set of XML grammar rules to transform the XML document to the at least one XML document structured according to the at least one subset of the set of XML grammar rules.

2. The method according to claim 1, wherein the steps of retrieving and transforming are performed by a server having an XML grammar restrictor module and an Extensible Style Language Transformation (XSLT) engine.

3. The method according to claim 2, wherein the XML grammar restrictor module and the XSLT engine form an XML grammar restrictor.

4. The method according to claim 3, wherein the XML grammar restrictor is stored within on at least one computer readable medium.

5. The method according to claim 1, wherein the step of retrieving at least one GRSS includes the step of accessing a database of GRSSs.

6. The method according to claim 1, wherein the step of retrieving at least one grammar restriction style sheet (GRSS) corresponding to the at least one subset of a set of XML grammar rules includes the steps of:

determining at least one destination device for the XML document;

determining for the at least one destination device a corresponding subset of the XML grammar rule set; and retrieving a GRSS corresponding to the corresponding subset of the XML grammar rule set.

7. The method according to claim 6, wherein the step of determining for the at least one destination device a corresponding subset of the XML grammar rule set includes the step of using a look-up table to correlate the at least one destination device with the corresponding subset of the XML grammar rule set.

8. The method according to claim 6, wherein the step of retrieving a GRSS corresponding to the corresponding subset of the XML grammar rule set includes the step of using a look-up table to correlate the corresponding subset of the grammar rule set with the GRSS.

9. The method according to claim 1, wherein the step of using the transformation rules of each retrieved GRSS for transforming data elements of the XML document includes the steps of:

identifying data elements of the XML document that are not structured according to grammar rules of the at least one subset of the set of XML grammar rules; and transforming the identified data elements into data elements that are structured according to grammar rules of the at least one subset of the set of XML grammar rules.

10. A system for transforming an XML document for transforming an XML document structured according to a set of XML grammar rules into at least one XML document structured according to at least one subset of the set of XML grammar rules, the system comprising:

a controller capable of executing a set of programmable instructions for retrieving at least one grammar restriction system sheet (GRSS) corresponding to at least one subset of a set of XML grammar rules, where the at least one GRSS includes transformation rules for transforming an XML document to at least one XML document structured according to the at least one subset of the set of XML grammar rules; and a transformation engine for using the transformation rules of each retrieved GRSS for transforming data elements of the XML document to data elements structured according to the at least one subset of the set of XML grammar rules to transform the XML document to the at least one XML document structured according to the at least one subset of the set of XML grammar rules.

11. The system according to claim 10, wherein the controller is located within a server having an XML grammar restrictor module and an Extensible Style Language Transformation (XSLT) engine.

12. The system according to claim 11, wherein the XML grammar restrictor module and the XSLT engine form an XML grammar restrictor.

13. The system according to claim 12, wherein the XML grammar restrictor is stored within at least one computer readable medium.

14. The system according to claim 10, wherein the at least one GRSS is retrieved from a database of GRSSs.

15. The system according to claim 10, wherein the controller comprises:

means for determining at least one destination device for the XML document;

means for determining for the at least one destination device a corresponding subset of the XML grammar rule set; and means for retrieving a GRSS corresponding to the corresponding subset of the XML grammar rule set.

16. The system according to claim 15, wherein the means for determining for the at least one destination device a corresponding subset of the XML grammar rule set comprises means for using a look-up table to correlate the at least one destination device with the corresponding subset of the XML grammar rule set.

17. The system according to claim 15, wherein the means for retrieving a GRSS corresponding to the corresponding subset of the XML grammar rule set comprises means for using a look-up table to correlate the corresponding subset of the XML grammar rule set with the GRSS.

18. The system according to claim 10, wherein the transformation engine comprises:

means for identifying data elements of the XML document that are not structured according to grammar rules of the at least one subset of the set of XML grammar rules; and means for transforming the identified data elements into data elements that are structured according to grammar rules of the at least one subset of the set of XML grammar rules.

19. A grammar restrictor for transforming a document structured according to a set of grammar rules into at least one document structured according to at least one subset of the set of grammar rules, the grammar restrictor comprising:

a software module for retrieving at least one grammar restriction style sheet corresponding to the at least one subset of the set of grammar rules, where the at least one style sheet includes transformation rules for transforming the document to the at least one document structured according to the at least one subset of the set of grammar rules; and a software module for providing the retrieved at least one style sheet to a transformation engine for transforming data elements of the document using the transformation rules of the at least one retrieved style sheet to data elements structured according to the at least one subset of the set of grammar rules to transform the document to the at least one document structured according to the at least one subset of the set of grammar rules.

20. The grammar restrictor according to claim 19, wherein the grammar restrictor is stored within at least one computer readable medium.

21. The grammar restrictor according to claim 19, wherein the at least one retrieved style sheet sets forth XML transformation noes for transforming an XML document structured according to a set of XML grammar rules into at least one document structured according to at least one subset of the set of XML grammar rules.

* * * * *